(No Model.) 4 Sheets—Sheet 1.
C. L. SHOLES.
TYPE WRITING MACHINE.
No. 558,428. Patented Apr. 14, 1896.
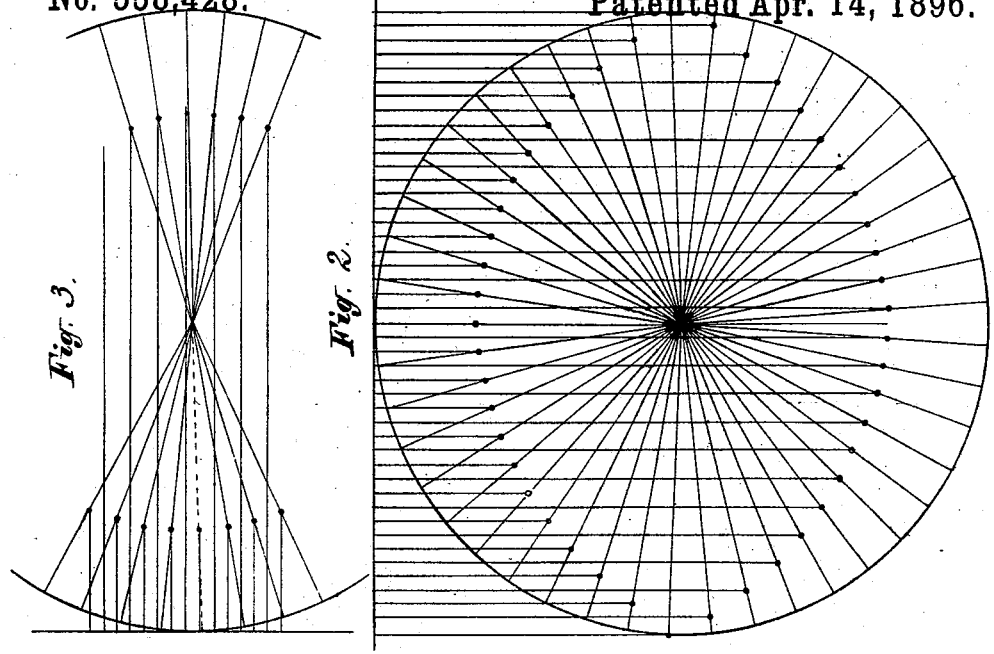
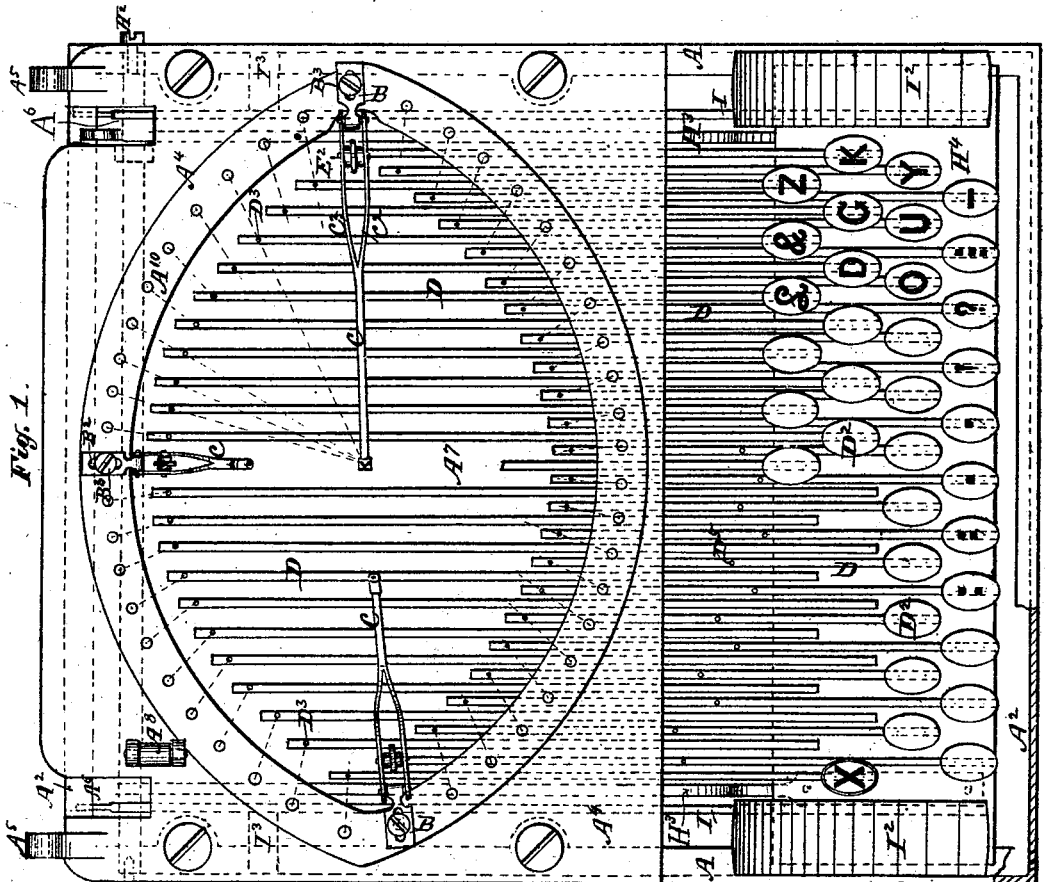
Witnesses:
H. Eihling
E. E. Masson
C. Latham Sholes, Inventor.
By James Densmore, atty.

(No Model.) 4 Sheets—Sheet 2.
C. L. SHOLES.
TYPE WRITING MACHINE.
No. 558,428. Patented Apr. 14, 1896.
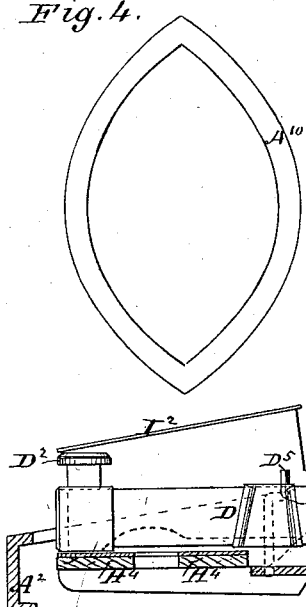
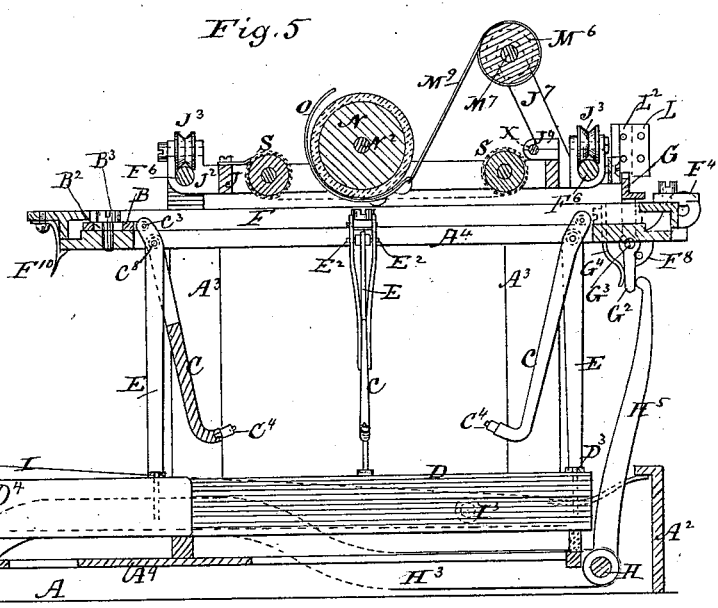
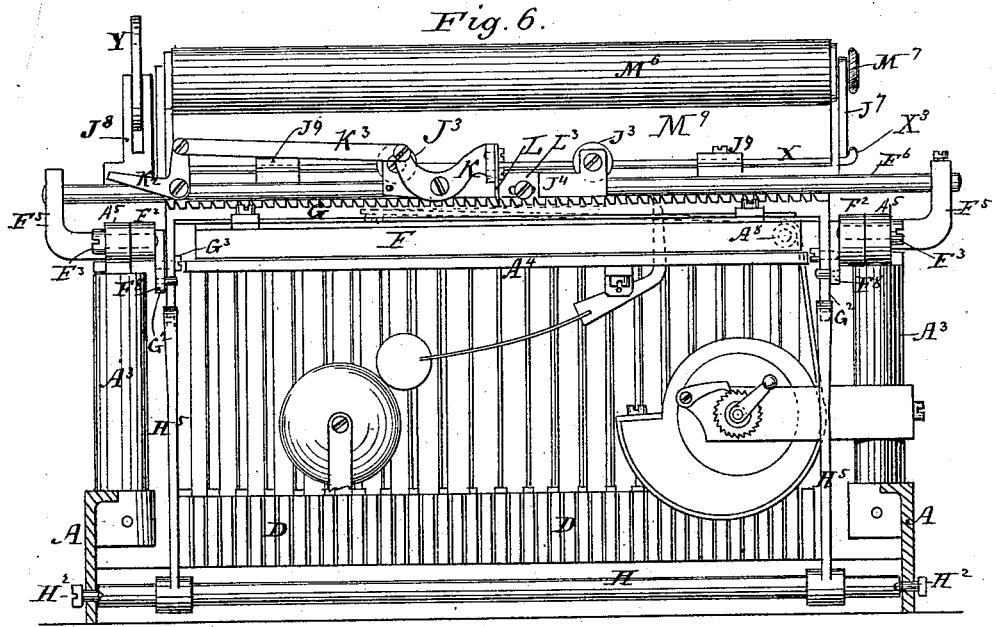
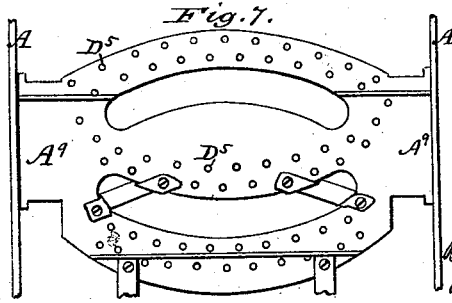
Witnesses:
Henry Eichling
E. E. Masson
Inventor.
C. Latham Sholes,
by James Densmore,
atty.

(No Model.) 4 Sheets—Sheet 3.
C. L. SHOLES.
TYPE WRITING MACHINE.
No. 558,428. Patented Apr. 14, 1896.
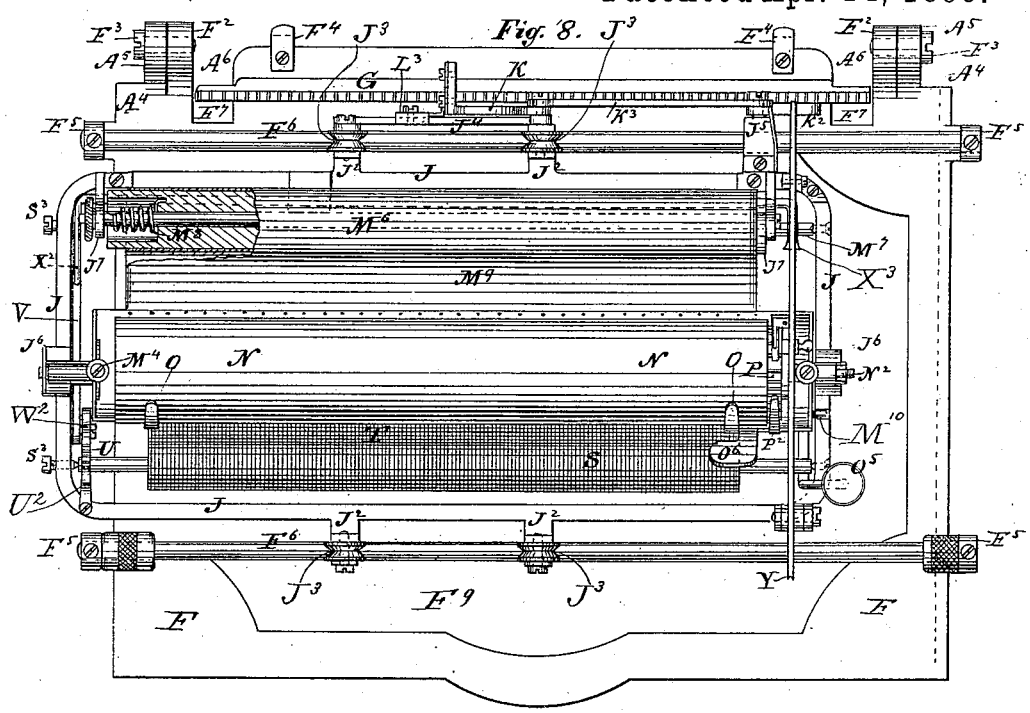
Witnesses:
Henry Eichling
E. E. Masson
Inventor:
C. Latham Sholes,
By James Densmore,
atty.

(No Model.) 4 Sheets—Sheet 4.
C. L. SHOLES.
TYPE WRITING MACHINE.
No. 558,428. Patented Apr. 14, 1896.
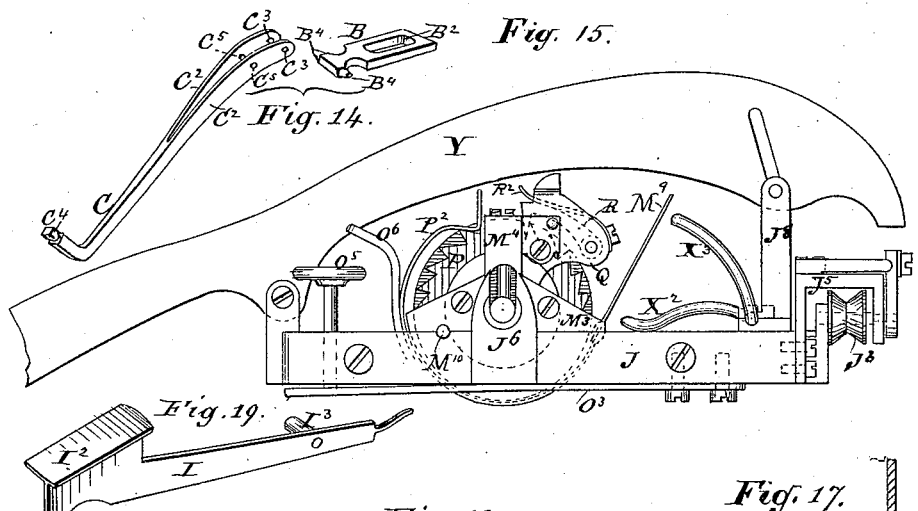
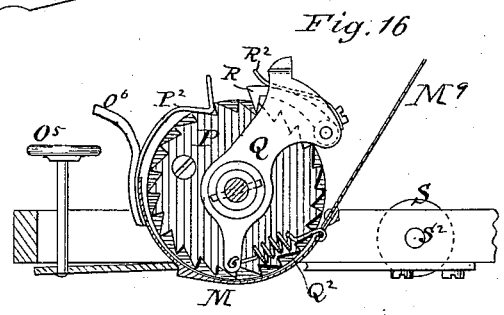
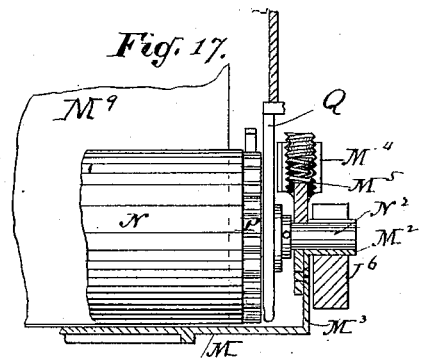
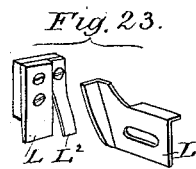
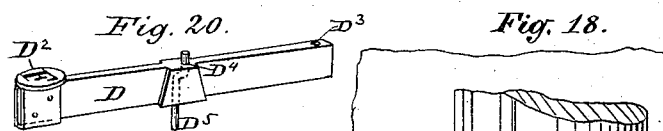
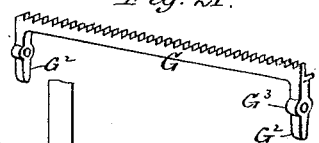
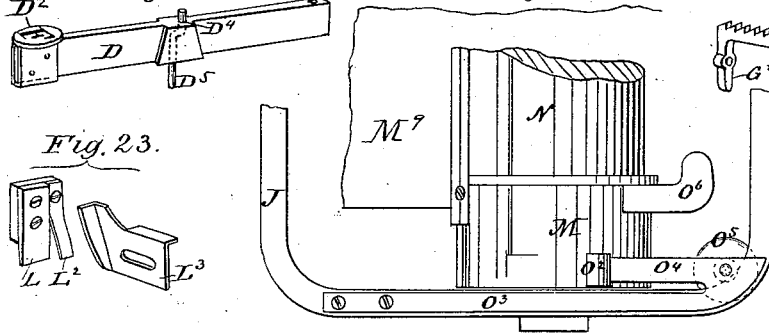
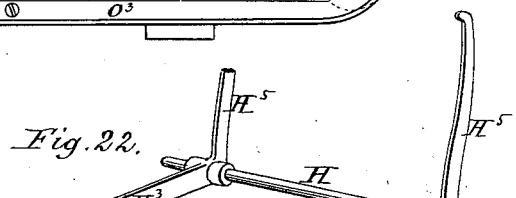
Witnesses:
Henry Leichling
E. E. Masson
Inventor
C. Latham Sholes,
By James Densmore,
atty.

UNITED STATES PATENT OFFICE.

CHRISTOPHER LATHAM SHOLES, OF MILWAUKEE, WISCONSIN, ASSIGNOR TO ERNEST R. BARRON, DANIEL C. ROUNDY, AND CLARENCE W. SEAMANS, EXECUTORS OF JAMES DENSMORE, DECEASED.

TYPE-WRITING MACHINE.

SPECIFICATION forming part of Letters Patent No. 558,428, dated April 14, 1896.

Application filed December 31, 1881. Serial No. 49,127. (No model.)

*To all whom it may concern:*

Be it known that I, CHRISTOPHER LATHAM SHOLES, of the city and county of Milwaukee and State of Wisconsin, have invented Improvements in Type-Writing Machines, of which the following is a specification.

The invention relates to that class of such machines in which the types are pivoted and adapted to vibrate, and the nature thereof may be described as follows:

First. In a type-writing machine, the combination, with an oval, elliptical, or like disk, of a series of types which are pivoted and set around a common point in an oval or elliptical form, or series, with the key-levers and lifts or connecting-rods.

Second. In a type-writing machine, the combination, with a partly circular and partly oval or elliptical disk, of a series of types which are pivoted and set around a common point partly in a circular form and partly in oval or elliptical form, with the key-levers and lifts or connecting-rods.

Third. In a type-writing machine, the combination, with an oval or elliptical disk, of a series of types which are pivoted and set around a common point in an oval or elliptical form, found by drawing parallel lines, equidistant and as far apart as desired, as many as there are types to be used, then over said lines a circle whose diameter is the distance across said lines, then in said circle, equidistant apart, the same number of radial lines, then a diametrical line of said circle, either across or parallel with said parallel lines, and then a curved line on each side of said diametrical line, through the points at the intersection of each alternate parallel line with the corresponding radial line, with the key-levers and lifts or connecting-rods.

Fourth. In a type-writing machine, the combination of a series of key-levers of which each has the power at one end and the weight at the other and the fulcrum between the two ends, and a series of lifts or connecting-rods, with a series of type-bars of which each is a lever which has the fulcrum at one end and the weight at the other and the power between the two ends, and which are pivoted and set around a common point in an oval or elliptical or like form, whereby the point of connection of each lift or connecting-rod with its type-bar will be directly or nearly vertically over the point of connection with its key-lever.

Fifth. In a type-writing machine, the combination of a bifurcated type-bar which has a journal-bearing in each fork, with a hanger which has a journal or pivot point on each side.

Sixth. In a type-writing machine, the combination of a space-key, abreast and on each side of the keyboard or series of type-keys or key-lever keys, with the letter-space apparatus.

Seventh. In a type-writing machine, the combination of a letter-space rack attached to the main frame and adapted to vibrate transversely, and letter-space ratchets attached to the carriage, with the letter-space vibratory frame.

Eighth. In a type-writer machine, the combination of an arm or arms attached to the letter-space vibratory frame, with and adapted to vibrate the letter-space rack attached to the main frame.

Ninth. In a type-writing machine, the combination of a secondary top plate, to which are attached the carriage and letter-space rack and ratchets, with the primary top plate of a main frame to which is attached the disk or series of types, by mechanism whereby the secondary top plate and attachments are adapted to move up and off from over the primary top plate and attachments or down on and over the same.

Tenth. In a type-writing machine, the combination of an inking-ribbon and ribbon-moving apparatus, separate and apart from the platen, with and on and attached to the carriage.

Eleventh. In a type-writing machine, the combination of the carriage with a platen adapted to be stationary or to turn on its axis and a spring and pressure bed or plate adapted to be stationary while the platen may turn.

Twelfth. In a type-writing machine, the combination of yielding pressure-springs attached to the platen with the carriage and pressure bed or plate, whereby the platen may yield and any substance against it to be written on may be always in the same plane at the point of impingement of the types.

Thirteenth. In a type-writing machine, the combination of the carriage with a pressure bed or plate adapted to be stationary or to turn on its axis and a platen adapted to be stationary or to turn independently on its axis, whereby the platen may be moved in line with the carriage and may turn independently of its axis or may turn jointly with the pressure bed or plate and move the part at the point of impingement of the types up in view of the operator and then back to said point of impingement.

Fourteenth. In a type-writing machine, the combination of the carriage and line-space apparatus with a platen adapted to be stationary or to turn on its axis and a pressure bed or plate adapted to be stationary while the platen may turn independently or to turn jointly with the platen on a common axis, whereby the platen may move in line with the carriage and may turn independently on its axis or may turn jointly with the pressure bed or plate and move the part at the point of impingement of the types up in view of the operator and then back to said point of impingement.

Fifteenth. In a type-writing machine, the combination of the line-space ratchet-wheel attached to a platen adapted to be stationary or to turn on its axis with the line-space ratchet attached to a pressure bed or plate adapted to be stationary while the platen may turn independently or to turn jointly with the platen on a common axis, whereby the platen may move in line with the carriage and may turn fixedly and independently or may turn jointly with the pressure bed or plate and move the part at the point of impingement of the types up in view of the operator and then back to said point of impingement.

The invention further consists in various features, details, and combinations hereinafter set forth and claimed.

In the drawings, Figure 1 represents a top view of a type-writing machine which embodies the invention, from which the secondary top plate is removed; Fig. 2, a view illustrating the method by which the form of the disk or form in which the types are set is found; Fig. 3, a view of a modification of the same; Fig. 4, a view of a modified form of the disk or form in which the types are set; Fig. 5, a side sectional view of the machine; Fig. 6, a rear sectional view of the same; Fig. 7, a view of the bed-plate; Fig. 8, a view of the secondary top plate and carriage and attachments thereof; Fig. 9, a view of the inking-ribbon and ribbon-moving apparatus; Fig. 10, an end view of the ribbon-moving apparatus; Fig. 11, a view of the pressure bed or plate; Fig. 12, a transverse sectional view of the same; Fig. 13, a perspective view of the pressure bed or plate; Fig. 14, a perspective view of a type-bar and hanger; Fig. 15, an end view of the carriage and attachments; Fig. 16, a sectional view through a portion of the same just within the end of the pressure bed or plate; Fig. 17, a front elevation, partly in section, of the parts shown in Fig. 15; Fig. 18, a bottom view of a part of the same; Fig. 19, a perspective view of one of the space-key levers; Fig. 20, a view of a type-key lever; Fig. 21, a view of the letter-space rack; Fig. 22, a view of the letter-space vibratory frame, and Fig. 23 a view of the letter-space ratchets and stop.

In the drawings, A A indicate the side plates of the main frame of a type-writing machine, which are connected by front and rear cross-plates $A^2 A^2$, Figs. 1, 5, and 6. At or near the rear end, and at or about the middle of each side plate $A^2$, is a post $A^3$, which posts rise to a suitable height to support the top plate $A^4$, which plate is formed with slots or openings $A^6$ in its rear edge, and with a large aperture or opening $A^7$. (Shown as of substantially elliptical shape, as best seen in Fig. 1.)

Carried in suitable bearings on the top plate $A^4$, in rear and at the left-hand side of the opening $A^7$, is a roller or bearing-wheel $A^8$, Fig. 1, and at the rear side or edge of the top plate $A^4$ are ears or lugs $A^5$, perforated to form bearings for journals or pivots $F^3$, which pass through the ears or lugs $A^5$ and are screwed into similar ears or lugs $F^2$, formed upon the rear side of a secondary top plate F, as shown in Fig. 8.

Extending across the bottom of the main frame, from one side plate A to the other, is a bed-plate $A^9$, Figs. 5 and 7.

B, Figs. 1, 5, and 14, indicates a small plate or hanger, of which there is a series, corresponding in number with the number of type-bars to be used. Each plate or hanger is formed with an adjusting slot or opening $B^2$, through which passes a fastening-screw $B^3$, threaded to fit a hole tapped in the top plate $A^4$.

The plates or hangers B are disposed or arranged on the top plate $A^4$ around the opening $A^7$ therein, as indicated in Fig. 1, wherein three such plates or hangers are shown, and the positions of the others are indicated by the screw-holes $A^{10}$.

The heads of the fastening-screws $B^3$ bear upon the plates or hangers B and bind or clamp them firmly to plate $A^4$, but by loosening its screw any plate or hanger may be made free to turn or move, as required, to adjust the type-bar which it carries, and thus to insure proper alinement of the type.

The inner or overhanging end of each plate or hanger $B^2$ is formed with two journals or pivot-pins $B^4$, one on either side, as shown in Figs. 1 and 14, upon which are hung or hinged the arms of a bifurcated type-bar C.

As best shown in Fig. 14, each type-bar C comprises a main stem or body C and a forked or bifurcated rear end $C^2$, the arms of which latter are formed with seats or sockets C³ to fit or to receive the pivots or journals B⁴ of the plate or hanger B which carries it. Each type-bar carries at its inner end a type C⁴, as shown in Figs. 5 and 14, and, as shown in Figs. 1, 5, and 14, each arm of the fork C² is provided with a pivot or journal bearing C⁵ at a point between the seats or steps C³ and the types C⁴, for enabling connection to be conveniently made with the lift or connecting-rod, as presently explained.

In Figs. 1, 5, and 6, D indicates one of a series of levers, the number of which corresponds with the number of type-bars employed. The preferred construction of these levers is illustrated in Figs. 1, 5, and 20.

In practice it is desirable to pivot the levers at a point midway between their ends, so that all shall have like leverage and produce a like movement of the type-bar for a given movement of the finger-button carried at the forward or outer end of such lever.

At the point at which the lever is to be pivoted it is formed with a swell or enlargement within which is a slot or cavity, closed at its upper side except for a small perforation. Each lever is supported upon a post or stem D⁵, the upper end of which is bent first horizontally and then vertically to form a fulcrum-point D⁴, as shown in Figs. 1, 5, and 20. The levers D are arranged below the top plate A⁴, between and parallel with the side plates A of the main frame, and are each furnished at the forward or outer end with a finger-button or type-key D². At the rear end of each lever there is formed a perforation D³ to receive the reduced lower end of a lift or connecting-rod E, employed to connect the key-lever with its type-bar C.

As shown in Fig. 7, the fulcrums or bearings D⁵ are disposed in an elliptical or substantially elliptical series, similar to that of the plates or hangers D², so that both arms of each lever D have the same length and the same extent of movement, or substantially the same, and each lift or connecting-rod stands in a vertical or substantially vertical position, giving the greatest effectiveness of stroke possible to be given, and avoiding obliquity of push or lateral deflection of the type-bar, as shown in Figs. 5 and 6.

Each lift or connecting-rod E above mentioned is formed with a journal E² on each side of its upper end, as seen in Fig. 1, which journals are seated in the bearings C⁵ of the type-bars C directly above such rod, while the lower end of the rod is stepped or seated in the key, as indicated in Fig. 5, or is otherwise suitably connected therewith.

I have above mentioned a secondary top plate F, hinged to the primary top plate, and have noted the ears or lugs F² thereof. In addition to said ears or lugs, the secondary plate F is also formed or furnished with lugs F⁴, Figs. 5 and 8, projecting rearward and designed to limit the movement of said secondary plate F in swinging upon its journals or hinges, so that it may not fall or be carried over backward beyond the distance necessary to expose its lower side and to cause said top plate to stand alone, if this be desired. Ordinarily, and under the construction illustrated in the drawings, the secondary top plate is permitted to assume a position slightly inclining backward beyond the vertical plane of its journals or hinge axis.

At each side of the secondary top plate F (treating as sides the portions parallel with the side plates A of the main frame) there are two upwardly-extending lugs or posts F⁵, one near each forward corner of said plate and one near each rear corner thereof, as shown in Fig. 8.

Extending parallel with the front and rear cross-plates A² of the main frame, and connecting the forward and rear pairs of ears F⁵, respectively, are two rails or rods F⁶, Figs. 5, 6, and 8, which serve to support and guide the carriage J, hereinafter referred to.

Directly over and coincident with the openings or slots A⁶ of the primary top plate A⁴ are similar openings or slots F⁷, as shown in Fig. 8, and extending downward from the rear portion of the secondary plate F below each hinge lug or ear F², and by the side of the slot or opening F⁷, is a lug F⁸. (Seen in Figs. 5 and 6.)

The secondary top plate is provided with a large opening F⁹, Fig. 8, or in other words is cut away as much as is consistent with proper strength and stiffness.

To prevent the supplemental top plate from being accidentally or inopportunely lifted or from falling back when the machine is tilted from its proper position, it is furnished at its forward side with a spring-catch or locking device F¹⁰, which as the plate F is lowered to place rides over and engages beneath the edge of primary top plate A⁴, as shown in Fig. 5.

G indicates a letter-space rack-bar, which is formed with depending arms G² at or near its ends, as shown in Figs. 5, 6, and 21, said arms being carried downward through the slots or openings A⁶ F⁷ of the top plates and sustained by pivots or screws G³, extending through said arms G² and into lugs F⁸, as shown in Figs. 5 and 6. The rearward movement of the lower ends of the arms G², and consequently the forward movement of the rack-bar G, is limited by suitable stops, (shown in Figs. 5 and 6,) against which stops the arms are normally pressed and held by springs G⁴, Fig. 5.

Extending from one side plate A to the other, near the rear cross-plate A², is a rocking bar or rock-shaft H, Fig. 5, the ends of which are carried upon pivot-points or other suitable bearings, pointed screws H² passing through the side plates A² and seated in sockets in the ends of the rock-shaft H, being represented in Fig. 6 of the drawings.

Projecting forward from the rock-shaft H, and nearly to the front plate A², are two bars or arms H³, one at or near either end of the rock-shaft, said arms passing between the side plates A and the key-levers D, as shown in Fig. 1, and bearing at their forward ends a plate or bar H⁴, which latter passes beneath all the key-levers D, as shown in Figs. 1 and 5.

Rising from each end of the rock-shaft or rocking bar H, and preferably forming a continuation of the horizontal arm or bar H³ at that point, is an upright arm H⁵, the upper extremity of which extends to and bears against the rear side of the corresponding depending arm G² of the rack-bar G, as shown in Figs. 5 and 6. From this construction and arrangement it will be apparent that upon the depression of any key-lever D of the series the plate or bar H⁴, and consequently the arms H³, will be depressed, the upright arms H⁵ will be thrown forward, and the rack-bar G will be thrown backward against the pressure of springs G⁴, which will return the parts to their first positions as soon as the key-lever is freed from pressure. From this it follows that whenever a key-lever is depressed to cause a character to be printed, and allowed to return to its normal position, the rack-bar G will be vibrated, and, as will be explained further on, this vibration will permit the necessary letter-spacing or advance of the carriage. In order to provide for spacing between words or letters, or before or after the same, when printing-keys are not depressed, I provide two space-levers I, locating them one between each horizontal arm H³ and the proximate side plate A, Figs. 1 and 5, said levers overhanging or bearing upon the plate or board H⁴ and being each furnished with a long key I², which extends beside and abreast of or substantially in plane with the keyboard or series of type-keys D².

The space-levers I are mounted upon pivot-pins I³, (shown in dotted lines in Figs. 1 and 5 and in full lines in Fig. 19,) one passing through each lever and attached to or screwed into the proximate side plate A, and each of said levers is formed or furnished with a spring at the rear end to maintain the key at the proper elevation, as shown in Figs. 5 and 19.

Mounted and arranged to travel upon the supplemental top plate F is a carriage J, in which are supported the platen or paper-roll and other parts hereinafter referred to.

The carriage proper consists primarily of a frame J, in the general form of a parallelogram, as shown in Figs. 8 and 9, provided with lugs J², Figs. 5 and 8, projecting from the front and rear bars of the frame, and fashioned into open-top forks to straddle or to receive the guide rails or rods F⁶, already mentioned as extending between the ears F⁵ of the secondary top plate F. In the fork of each lug J² there is mounted a grooved carrying-wheel J³, which rests upon one and is guided by one or the other of the rails F⁶, as shown in Figs. 5, 6, and 8. The wheels J³ are held in place by screws or pins passing through the arms or forks J² and constituting axles for said wheels, thereby permitting removal of the wheels when necessary. Under this construction and arrangement the carriage J is supported wholly by the wheels or rollers J³, which in turn rest upon and are guided by the rails F⁶. The rails form a very simple, cheap, and efficient guide, and can be made straight and true at slight expense without planing or like machine-work. The V form of the grooves causes the rolls to maintain a proper position upon or relation to the rails F⁶, and prevents any shifting of the carriage transversely to its line of travel.

Extending from one to the other of the rearwardly-projecting lugs J² of the carriage J is a bar J⁴, which may conveniently be secured in place thereon by the screws upon which rollers J² rotate, as indicated in Figs. 6 and 8. Pivoted upon the bar J⁴ is a lever K, one end of which bends laterally outward and forms a supporting-plate for a rigid dog L and a spring-dog L², the play or spring of which latter is limited and determined by an adjustable stop-plate L³, clamped to the plate or bar J⁴ by a suitable binding-screw, as shown in Figs. 6 and 8, the dogs and stop-plate being also separately shown in Fig. 23.

From the upper end of the rear arm of lever K, or the right-hand end, looking from the front of the machine, a connecting-rod K³ extends to and connects with the upright arm of an elbow-lever K², pivotally secured to a lug or stud J⁵, projecting from the rear side of carriage J, as seen in Fig. 8. By depressing the horizontal arm of lever K² the dogs of lever K may be lifted above and clear of the letter-space rack-bar G, with which the spring-dog L² stands normally in engagement.

As shown in Fig. 6, a strap or band connects at one end with the carriage J, passes thence over the bearing-roll A⁸, and thence down to a cam-shaped spring-drum, to which its other end is made fast in any common way.

The spring-drum, acting through the connecting strap or band, exerts a constant pull upon the carriage toward the right hand in Fig. 6 or toward the left hand in Fig. 8, which latter shows the front of the machine toward the observer or the machine in the position which it occupies in use.

The rack-bar G being normally thrown toward the carriage J by the springs G⁴, said bar stands normally in alinement with the spring-dog L², and owing to the superior strength of the propelling-spring within the cam-shaped drum the carriage is moved forward until the backing-plate comes directly against the free end of the spring-dog and the rigid dog is brought up into alinement with it. It will therefore be apparent that whenever a letter-key or space-key is depressed and the rack-bar G is thrown backward through the medium of levers and arms H³ H⁵, as above explained, the rack-bar will pass out of alinement and engagement with the spring-dog L² and into alinement and engagement with the rigid dog L; but as the two dogs are at such time in the same plane there will be no advance of the carriage J.

As the rack-bar rides or swings away from and out of engagement with the spring-dog $L^2$, the latter springs forward or away from its backing-plate until it strikes the stop-plate $J^4$, which is so adjusted as to stop the free end of the dog directly beside or in line with the next notch or in front of the next tooth of the rack-bar, so that upon the release of the depressed key and the return of the rack-bar G to its forward or normal position the yielding dog shall engage said next tooth. The carriage being now held only by the spring-dog $L^2$, will advance as before until the rigid dog is brought up into plane with the yielding dog, as just explained, and this operation will occur upon the depression and release of each and every printing-key and space-key, and hence the carriage will advance one letter-space at each depression and release.

The stroke of the type being effected by the depression of the key, it is important that the advance of the carriage take place upon the release and rise of the key after the printing is effected, and this is accomplished by the mechanism above set forth.

Rising from each end bar of carriage J at a point suitably distant from the front and rear bars is a post or standard $J^6$, Figs. 8, 9, 15, and 17, which posts serve to support and carry a concave pressure-bed or paper-support M and a paper-roll or platen N.

The posts or standards $J^6$ are formed with seats or bearings, as shown in said figures, to receive tubular journals $M^2$, formed upon the end plates $M^3$ of the pressure bed, plate, or support M, as illustrated in Figs. 9, 10, 13, and 17.

The tubular journals $M^2$ serve not only to sustain or carry the pressure-bed or paper-support M in the posts or standards $J^6$, but they also in turn afford bearings or seats for the journals $N^2$ of the paper-roll or platen N, as will be readily understood upon reference to Figs. 15 and 17. From this construction and arrangement it follows that the paper-roll or platen and the pressure bed or plate may be turned each independently of the other, and that both may turn together.

Secured to and rising from the end plates $M^3$ of the pressure bed, plate, or paper-support M are tubular extensions or shells $M^4$, one for each, as clearly shown in Figs. 15 and 17, which shells are cut away, as shown in Fig. 15, to straddle and to permit the free rise and fall of the journals $N^2$ of the paper-roll or platen M.

Within each of the tubular extensions or shells $M^4$ there is located a spiral spring $M^5$, which springs, directly or through the medium of sliding followers, (seen in Figs. 15 and 17,) bear upon the journals $N^2$ of the paper-roll or platen and hold them down within the seats in the tubular shell $M^2$ of the pressure-bed or paper-support M. The pressure or force of the springs $M^5$ is regulated and determined by screws placed above them and screwing into the upper ends of the shells or extensions $M^4$, as seen in Fig. 17.

The purpose of the construction just set forth is to maintain the pressure bed, plate, or paper-support in a given plane or at a certain level while permitting the paper-roll or platen to rise as required to accommodate varying thicknesses of material or varying numbers of sheets of paper between it and the pressure bed or plate or paper-support. In this way, while accommodating any number or thickness of sheets upon which it is practicable to print and manifold, I maintain the surface against which the types strike always in the same plane, whether using one or many sheets, and whatever may be the thickness of the material printed upon, and consequently the types strike fairly and equally over their whole faces, instead of striking heavily at one or the other side and lightly at the opposite side.

At the rear of carriage J are uprights or standards $J^7$, Figs. 5, 6, and 8, in which are mounted the ends or journals of a rod or shaft $M^7$, which forms an axle or axial support for the roller $M^6$. Within one end of the roller $M^6$, which is made tubular to receive it, there is placed a spiral spring $M^8$, one end of which is made fast to the contiguous post or standard $J^7$, while the other end is made fast to the roller $M^6$, as shown in Fig. 8, so that if the roller be turned the spring will be coiled and put under compression or tension sufficient to return the roller to its first position when left free to return.

$M^9$ indicates a flexible apron or paper-table wound upon the roller $M^6$, one edge of which apron is attached to the roller $M^6$ and the other edge of which is made fast to the rear edge of the pressure bed, plate, or paper-holder M, as shown in Figs. 5, 6, 8, 9, 11, 12, 13, 15, 16, 17, and 18.

The backward rocking of the pressure bed, plate, or paper-holder M is limited by a stop of any suitable character. (Represented in Figs. 8, 9, and 15 as a simple stud $M^{10}$, projecting from one of the plates $M^3$ and bearing upon the end bar of carriage J.)

The tension or compression of spring $M^8$, when the parts are in their normal positions, is sufficient to hold the stop in contact with the carriage-frame, and thus the proper normal position of the pressure bed or table is maintained; but by applying slight force to the pressure-bed or paper-support it may be rocked upon its journal, to carry its forward edge upward and its rear edge downward against the resistance of the spring, the apron $M^9$ unwinding to permit such movement, and in so doing turning the roll $M^6$ and placing the spring $M^8$ under further tension or compression, sufficient to again take up the apron and move back the pressure-bed or paper-support M. To facilitate this rocking or movement of the pressure bed, plate, or paper-support, it is furnished with a thumb-piece or lever $O^6$, projecting outward to a point within easy reach of the operator.

The pressure-bed or paper-support is further formed or furnished with arms O, which curve upward around the front of the paper-roll or platen, as shown in Figs. 5, 8, and 13, and has on its under side a block or lug $O^2$, with which engages a detent or locking-arm $O^4$, formed upon or carried by a spring $O^3$, secured to the lower side of the carriage-frame, and provided at its free end with a finger-button $O^5$, by which the spring may be depressed to throw the detent out of engagement with or out of the path of the block or lug $O^2$. It will thus be seen that the pressure bed or plate is normally locked and held against rocking or turning either forward or backward; but that after depressing the finger-key $O^5$, which occupies a position at the right-hand forward corner of the carriage, the pressure bed or plate may be rocked upward and forward by raising the lever or thumb-piece $O^6$. When released, the parts resume and are locked in their normal positions.

P indicates a line-space ratchet-wheel, secured rigidly or fixedly upon the end of paper-roll or platen N, and $P^2$ a spring-arm or pawl, made fast to the pressure-bed or paper-holder M and overhanging the ratchet-wheel P, with the teeth of which its free end engages, as shown in Figs. 8, 15, and 16.

The pressure-bed or paper-support M being normally held against movement upon its journals, the paper-roll or platen N may nevertheless be turned independently thereof to carry its front face upward, the long faces of the ratchet-teeth riding beneath and lifting the spring-arm or pawl $P^2$; but the platen is prevented from turning in the reverse direction independently of the pressure bed or plate by reason of engagement of said spring-arm or pawl $P^2$ with the radial or abrupt faces of the ratchet-teeth, as clearly illustrated in Figs. 15 and 16. If, however, it be desired to turn both the paper-roll or platen and the pressure bed or plate, as when it is desired to examine the work or to make a correction, the finger-button $O^5$ is depressed to unlock the pressure bed or plate, and the lever or thumb-piece $O^6$ is then elevated, the pressure-bed or paper-holder M and the paper-roll or platen N then moving as one, by reason of engagement of the spring-arm or pawl $P^2$ with ratchet P. The engagement of the spring-arm or pawl $P^2$ with the teeth of the ratchet, or the force with which it bears upon the long or rear faces of the teeth of the ratchet, is sufficient to insure the return of the platen or paper-roll to first position with the pressure bed or plate.

The terms "pressure bed or plate," "paper-support," and "paper-holder" are used throughout this specification as indicating a device by and between which and the platen the paper or other material to be written upon is held firmly against the platen and made to move therewith. It is obvious that its form may be varied without changing the mode or result of its operation. While at rest it forms a support or abutment upon which the paper rests and against which it is pressed by the platen, and when the platen and paper-support are moved to position to expose the printing line and back, the paper, being clamped or pressed between the two, moves with them.

Q indicates a swinging plate or pawl carrier, mounted and free to rock or swing upon the journal or shaft $N^2$ of the platen, as shown in Figs. 16 and 17. The lower end of this plate or pawl carrier Q is extended downward nearly to the pressure bed or plate M, and is connected therewith through the medium of a spiral spring $Q^2$, as shown in Fig. 16, by which spring its upper end is thrown and is normally held forward or in the position indicated in said figure.

The plate Q carries at one side a hook-shaped pawl or dog R, which overhangs the teeth of line-space ratchet P and is kept in engagement therewith by means of a light spring $R^2$, Figs. 15 and 16.

Being supported upon the journal or axle of the platen or paper-roll and connected with the pressure bed, plate, or paper-support, as above explained, it will be seen that the plate Q, and consequently the pawl R, will partake of the movements of the pressure-bed or paper-support and will exercise no influence thereupon; but when the pressure-bed or paper-support is held fast, a backward or downward movement of the upper end of the plate Q will carry backward and downward the hook-shaped pawl R, and this, engaging the teeth of the ratchet-wheel P, will turn said ratchet and consequently the paper-roll or platen, thereby advancing the paper one line-space, the paper then moving over and independently of the pressure-bed or paper-support, which, however, insures the necessary friction between the paper and platen.

The ratchet-wheel P being engaged by pawl $P^2$ cannot return, but the pawl R will ride freely back over the teeth of said wheel and resume its first position under the action of spring $Q^2$.

Supposing now that the machine is in use and that it be desired to examine the line which is being printed, but which, being at the under side of the platen or paper-roll, is hidden from view, it is only necessary to depress finger-key $O^5$ and elevate thumb-piece or lever $O^6$, thereby turning the platen or paper-roll and the pressure-bed or paper-holder with the plate Q and the two pawls, as one body, until the work is raised to view. When the work is sufficiently examined and ready to be returned, the thumb-piece or lever $O^6$ is either released and the parts permitted to return under the action of spring-roller $M^6$ and apron $M^9$ unretarded, or they are let back as slowly as desired under control of the thumb-piece or lever O⁶. The apron M⁹ serves both to support the paper during the rocking of the paper-roll or platen and the pressure bed or plate forward and backward, and as a guide and support for the paper generally.

To actuate the plate Q, or to turn the paper-roll or platen independently of the pressure bed, plate, or paper-support M, as when line-spacing is necessary, I provide a lever Y, which is pivoted in a suitable post or support at the forward side of the carriage J and extends forwardly and rearwardly from said support, as shown in Figs. 8 and 15. The forward end of the lever is fashioned into a suitable hand-piece to enable it to be readily operated, and the rear end is guided in or by a bifurcated post J⁸, its play therein being limited by a pin or screw passing through the post and through a slot in the lever concentric with its pivot. The rear end of the lever Y is extended backward to a point directly over the horizontal arm of the elbow-lever K², so that when the front end of lever Y is lifted to depress its rear end, and thereby to actuate plate Q and pawl R, the extreme rear end of said lever Y shall bear upon and depress said horizontal arm of lever K², and thereby lift the dogs L and L² clear of the rack-bar G, preparatory to moving the carriage back to its starting-point, which is or may be done by a sidewise movement of the lever Y.

When the platen is moved to expose the print, that portion of the line-space mechanism carried by it goes out of operative relation to the actuating lever or device, returning into said relation as the platen resumes its normal position.

S S represent two ribbon spools or rollers, one located in front and the other in rear of the paper-roll or platen and both parallel therewith. These spools or rollers are furnished with shafts or axles S², which are carried upon pivot screws or bearings S³, projecting inward from the ends of the frame of the carriage J. Each shaft S² carries a ratchet-wheel U, Figs. 8, 9, and 10, which wheels are each held against backward rotation by springs U², the ratchet-teeth being in reverse directions on the two wheels. The inking-ribbon T winds upon the spools or rollers S S and is designed to be wound from one to the other and back, the travel being in a direction transverse to the paper-roll or platen in the example shown. With the construction shown the ribbon T will be as wide as or wider than the length of the line which the machine can print, or as wide as the paper-roll or platen is long; but this is only true when the axes of the ribbon spools or rollers are placed parallel with that of the platen, which is not essential for all embodiments of the invention.

In thus referring to the width of the ribbon it is assumed that its greatest measurement is in the direction of its winding, as it will preferably or ordinarily be in practice; but I do not restrict myself to any length or width of ribbon, as these matters may vary with the construction or arrangement of the mechanism in which my invention is embodied.

Pivoted at a point midway between its ends to the frame of carriage J is a rocking bar or lever V, Figs. 8, 9, and 10, carrying at or near each end a hook-shaped pawl W, each provided with a curved or bent spring W², which, working over a stud or pin V², serves to hold the pawl in or out of engagement with its ratchet-wheel U, as required.

Journaled in blocks J⁹ at the rear side of the carriage J is a rock-shaft X, Figs. 5, 6, 9, and 10, furnished at one end with a forwardly-extending arm X², which bears upon the lever V, and at the other end with a similar arm X³, the free end of which is located in the path of lever Y, so that as the rear end of the lever is depressed it is caused to bear upon and to depress said arm X³ and consequently the arm X² and the lever or bar V, thereby causing the ribbon to be wound a slight distance from one roll S to the other in one or the other direction, according to adjustment of the pawls W. A spring Z or any equivalent device may be provided to return bar V to its first position.

It will be seen from the foregoing that the inking-ribbon is moved in two directions relatively to the printing-point, one crosswise or at an angle to the other, and that in the course of time substantially its entire surface is utilized. In the present instance this compound movement is effected by the passage of the inking-ribbon from one spool to the other and by the travel of the carriage over the printing-point; but, so far as I am aware, no one has ever before automatically moved the inking-ribbon in two directions relatively to the printing-point, whereby practically the entire printing-surface is utilized, and this I claim, broadly, and without restriction to special mechanism or to the dimensions or arrangement of the ribbon.

Having thus described my invention, what I claim is—

1. In a type-writing machine, the combination of a plate, and a series of type-bars which are pivoted upon said plate and set around a common point in an oval or elliptical series or group, with key-levers, and lifts or connecting-rods connecting the type-bars and the key-levers.

2. In a type-writing machine, the combination of a plate, and a series of type-bars pivotally mounted upon said plate about a common point in a partly circular and partly oval or elliptical group or series, with key-levers and lifts or connecting-rods for actuating the type-bars.

3. In a type-writing machine, the combination of a paper-support or platen, and a series of type-bars grouped in the form of an ellipse, and arranged to strike at a common point, the length of the bars varying to correspond with the distance from their common printing-point to their respective pivots.

4. In combination with a series of type-bars grouped in the form of an ellipse, a series of key-levers and a series of push-bars, each connecting one of said levers with one of the type-bars.

5. In a type-writing machine, the combination of a series of type-bars grouped about a common printing-point; a series of parallel key-levers, each having its rear end extended to a point directly beneath one of the type-bars; and links or rods for connecting the type-bars and key-levers, each link extending vertically from one of the key-levers directly to one of the type-bars; whereby the power is transmitted from each key-lever to its type-bar in a straight instead of an oblique line.

6. In a type-writing machine, the combination of a series of type-bars grouped about a common printing-point; a series of parallel key-levers, each having its fulcrum at the same relative distance from the ends as the other levers of the series; and a series of links or rods, each connecting one of the key-levers with one of the type-bars, each link extending vertically from the key-lever directly to the type-bar.

7. In a type-writing machine, the combination of a series of type-bars grouped about a common printing-point; a series of parallel key-levers, one for each type-bar; and a series of links or rods, one for each key-lever, each of said links or rods making a direct and straight line connection between one type-bar and its key-lever, whereby power is transmitted to each type-bar directly in the plane of its travel, without the use of intermediate levers.

8. In a type-writing machine, the combination of a series of type-bars grouped about a common printing-point; a series of parallel key-levers of the first order, one for each type-bar, each extending back to a point directly beneath its type-bar; and a series of push-rods, one for each key-lever, each of said push-rods extending vertically from its key-lever to its type-bar and arranged to lift the type-bar in advance of its pivot, whereby the greatest effectiveness of stroke is secured, and deflection of the type-bars is avoided.

9. In a type-writing machine, the combination of a series of type-bars, a series of finger-key levers for actuating said type-bars, and a series of rods for transmitting motion from the key-levers to the type-bars, every rod occupying a vertical position below its type-bar.

10. The combination of a series of key-levers, and a series of type-bars grouped around a common printing-point, and extending widthwise on each side a distance equal to that of the key-levers, whereby vertical actuating-rods may be employed directly between all of the key-levers and type-bars.

11. In a type-writing machine, the combination of a series of key-levers having their inner ends grouped in an elliptical form, of which each lever has the power at one end, the weight at the other end, and the fulcrum at an intermediate point, a series of lifts or connecting-rods, and a series of type-bars, of which each is a lever which has the fulcrum at one end, the weight at the other, and the power between the two ends, and which are pivoted and set around a common point in an oval or elliptical group, whereby the point of connection of each lift or connecting-rod with its type-bar is caused to be vertically over the point of connection with its key-lever or substantially so.

12. In a type-writing machine, the combination of a carriage, with a platen adapted to be made stationary or to turn on its axis, as desired, a spring and pressure bed or plate adapted to be stationary while the platen may turn, and a series of type-bars pivoted in said machine.

13. In a type-writing machine, the combination of the carriage with a pressure bed or plate adapted to be stationary or to turn on its axis, and a platen adapted to be stationary or to turn independently on the same axis, whereby the platen may move in line with the carriage and may turn independently on the common axis, or may turn jointly with the pressure bed or plate and move that part at the point of impingement of the types up into view of the operator and then back to the point of impingement.

14. In a type-writing machine, the combination of the carriage and line-space apparatus with a platen adapted to be made stationary or to turn on its axis, and a pressure bed or plate adapted to be stationary while the platen may turn independently, or to turn jointly with the platen on a common axis, whereby the platen may move in line with the carriage and may turn independently on the common axis, or may turn jointly with the pressure bed or plate and move the part at the point of impingement of the types up into view of the operator and then back to said point of impingement.

15. In a type-writing machine, the combination of a carriage, a platen adapted to turn on its axis, and a paper-guide adapted to be stationary and also to turn on the same axis with the platen, whereby the guide may turn with the platen when the latter is turned to expose to view the printing-point.

16. In a type-writing machine, the combination of the carriage and line-space apparatus, with a platen adapted to turn on its axis, and a pressure plate or guide adapted to be stationary while the platen may turn independently, or to turn jointly with the platen on a common axis, whereby the platen may turn independently on the common axis or may turn jointly with the pressure-plate to expose the printing-point.

17. In a type-writing machine, the combination of a platen, a pressure bed or plate, and springs arranged to press said parts together;

whereby the platen is enabled to yield, and the substance to be written upon is kept always in the same plane at the point of impingement of the types.

18. In a type-writing machine, the combination of a cylindrical platen, a pressure device to hold the substance to be written upon against said platen, and a device to turn said platen together with the substance to be written upon, in one direction to reveal to the eyes of the operator the written line, or the word or line last written, with a spring or spring device to turn said platen and substance to be written upon in the reverse direction back to place or to their normal positions.

19. In a type-writing machine, the combination of a cylindrical platen, a pressure bed or plate adapted to hold the substance to be written on against and in contact with said platen, another cylinder or roller parallel with said platen, a spring applied to said other cylinder or roller and adapted to turn the same in one direction, and an apron or flexible table attached to both said pressure bed or plate and to said other or second roller, with a locking device adapted to connect said platen with said pressure bed or plate or to disconnect the same at the will and discretion of the operator.

20. In a type-writing machine, the combination of a platen; a pressure bed or plate adapted to hold a sheet of paper in contact with the platen, the pressure bed or plate and the platen being capable of joint movement independently of the carriage; and means substantially such as described for locking the platen and paper-clamp in printing position.

21. In a type-writing machine, the combination of a platen, and a pressure bed or plate arranged longitudinally of the platen and having a fixed relation thereto during the printing operation, said pressure bed or plate adapted to bind a sheet of paper upon the platen, the platen and bed or plate being capable of both joint and independent movement, substantially as set forth.

22. In a type-writing machine, the combination of a platen, and a pressure bed or plate, the pressure bed or plate being held in contact with the platen or its paper by spring-pressure, and the platen being capable of movement, both independently of the pressure bed or plate and in unison therewith, whereby the sheet may be moved with the platen, between the platen and the pressure bed or plate, or the platen, sheet, and pressure bed or plate moved in unison.

23. In a type-writing machine, the combination of a carriage; a platen mounted in said carriage and movable independently thereof from its normal position to a position in which the printing-point may be viewed by the operator; mechanism for effecting a step-by-step rotation of the platen for line-spacing while the platen is in its normal position; and a pressure device adapted to hold the paper against the platen and assist in feeding the paper in line-spacing, said pressure device being bodily movable with the platen independently of the carriage, whereby the paper is prevented from shifting its position relatively to the platen while the platen is being moved from its normal position to the position for exposing the printing-point to view, and back to its normal position, and said line-spacing mechanism being so constructed and arranged as that the portion thereof which moves with the platen shall go out of and return into operative relation with its actuating device as the platen is moved from and returned to printing position.

24. In a type-writing machine, the combination of a traveling carriage, a platen mounted in said carriage and adapted to be moved independently thereof from its normal position to a position in which its under side may be seen by the operator, and to be returned to normal position, and mechanism for effecting a step-by-step rotation of the platen for line-spacing while the platen is in its normal position, said line-space mechanism being so constructed and arranged as that the portion thereof which moves with the platen shall go out of and return into operative relation with its actuating device as the platen is moved from and returned to printing position.

25. In a type-writing machine, the combination with a paper-carriage, of a roller-platen mounted in said carriage, line-spacing mechanism for rotating said platen step by step, the parts of said line-spacing mechanism being normally in operative relation, but automatically separable upon movement of the platen to expose the print, a series of type-bars arranged below said platen and adapted to strike and print on the under side thereof, and means for turning or swinging, by a continuous unbroken movement, the under side of said platen upwardly and forwardly; whereby the line being printed may be quickly exposed to the convenient view of the operator, and then returned to printing position without actuating or first resorting to the line-spacing mechanism.

26. In a type-writing machine, the combination with a non-lifting paper-carriage, of a roller-platen mounted in said carriage, line-spacing mechanism for rotating said platen step by step, a series of type-bars arranged below said platen and adapted to strike and print on the under side thereof, and means for turning or swinging by a continuous, unbroken movement, the under side of said platen upwardly and forwardly, the parts of the line-spacing mechanism being normally in operative relation, but automatically separable upon movement of the platen to expose the print; whereby the line being printed may be quickly exposed to the convenient view of the operator, and then returned to printing position without actuating or first resorting to the line-spacing mechanism.

27. In a type-writing machine, the combination of a traveling carriage, a platen mounted in said carriage and adapted to be moved independently thereof from its normal position to a position in which its under side may be viewed by the operator and to be returned to its normal position, a ratchet carried by the platen, and an actuating-lever mounted upon the traveling carriage and serving when operated to effect rotation of the ratchet and platen.

28. In a type-writing machine, the combination of a platen and a pressure bed or plate, the platen having cylindrical journals, and the pressure bed or plate having tubular journals within which the journals of the platen are seated.

29. In a type-writing machine, the combination of a platen provided with journals, a pressure bed or plate fitting closely to the platen and having tubular journals within which the journals of the platen are seated, and springs acting upon the platen-journals and serving to urge the platen toward the pressure bed or plate.

30. In combination with carriage J, provided with journal bearings or supports $J^6$, pressure bed or plate M, having the tubular journals $M^2$ seated in said bearings, and provided with shells $M^4$, platen N, having its journals seated within the tubular journals of the pressure bed or plate, and springs $M^5$ placed within the shells $M^4$ and serving to press the platen-journals down into their seats in the tubular journals of the pressure bed or plate.

31. In a type-writing machine, the combination of a platen-roll, a spring-roll, a web or apron wound about the spring-roll, and a connecting device between the platen and the apron, whereby the platen may be turned forward in opposition to the spring and returned to its first position thereby.

32. In a type-writing machine, the combination of a platen-roll, a spring, and intermediate connections whereby the turning of the platen is caused to put the spring under strain, and the spring is made to return the platen to its original position, when the latter is released.

33. In a type-writing machine, the combination of a platen, a spring connected with said platen, and a locking device for connecting and disconnecting the spring and the platen, whereby the platen is adapted to be turned in one direction manually, and returned to its first position by the spring, or turned manually and left in the position to which it is turned.

34. In a type-writing machine, the combination of a platen, a spring-roller, a pressure bed or plate, a ratchet-wheel carried by the platen, a dog connecting the platen and the pressure bed or plate, a locking device for holding the bed or plate against movement, and a web or apron connecting the bed or plate with the spring-roller.

35. In combination with a supporting-frame, platen-roll N, provided with ratchet-wheel P, pressure bed or plate M provided with detent $P^2$ to engage said ratchet-wheel, a locking device or catch for locking the pressure bed or plate against movement, and a dog carrier or plate Q provided with a dog to engage with the ratchet-wheel; whereby the platen may be rotated independently of the pressure bed or plate, or the two may be moved in unison.

36. In combination with a supporting-frame, provided with a locking-plate $O^3$ $O^4$, pressure bed or plate M journaled in said frame and provided with lug $o^2$, a stop to limit the downward movement of the front of the pressure bed or plate, detent $P^2$, platen N, provided with ratchet-wheel P, dog-carrier Q, provided with dog R, spring-roller $M^6$, and web or apron $M^4$, connecting the spring-roll and the pressure bed or plate.

37. In combination with a supporting-frame, a pressure bed or plate journaled therein, a stop to limit the rotation of the pressure bed or plate, a locking device for preventing such rotation, a rotatable platen provided with a ratchet-wheel, and a detent serving to connect the pressure bed or plate and the platen, and to prevent backward rotation of the platen.

38. In a type-writing machine, the combination of a frame or support, a pressure bed or plate journaled therein, a stop to limit the rotation of the pressure bed or plate, a locking device for preventing reverse rotation, a rotatable platen provided with a ratchet-wheel, a detent extending from the pressure bed or plate to the ratchet-wheel and serving to connect the two and to prevent backward rotation of the platen, and the pawl-carrier provided with a pawl, by which the ratchet-wheel may be rotated independently of the pressure bed or plate.

39. In a type-writing machine, the combination of a platen or paper roll, a pressure bed or plate serving to hold the paper against said roll, means for rotating said roll in one direction to bring to view the line being printed, and a spring acting upon said roll and serving to return it to its normal position.

40. In a type-writing machine, the combination of a platen or feed roll, a spring connected with and serving to turn the same in one direction, and a lift-key or finger-piece connected with and serving to turn said roll in the opposite direction.

41. In a type-writing machine, the combination of a platen or feed roll, a pressure bed or plate adapted to hold the paper in contact with the roll, a second roll parallel with the platen-roll, a spring applied to said second roll to turn it in one direction, a web or apron connecting the second roll with the pressure bed or clamp, and a locking device for connecting and disconnecting the platen-frame and the pressure bed or plate.

42. In a type-writing machine, the combination of a cylindrical platen, a pressure-bed or paper-clamp, a roller parallel with the platen, a spring to rotate said roller in one direction, an apron joining said roller and said pressure bed or clamp, and means for locking the bed or clamp against movement, and unlocking to permit the bed or clamp and platen to rotate together about a common axis.

43. The platen, in combination with the pressure-bed or paper-clamp, means for rotating the same conjointly a limited distance, means for returning the same to normal position, and the holding arm or detent, and catch or lip for retaining the bed or clamp in normal position.

44. The combination of the platen, the paper-clamp, the flexible extensible apron, and the spring-roller, all substantially as described and shown.

45. In combination with a platen or paper roll, a pressure bed or plate arranged to bear against the platen or against the sheet between said bed or plate and the platen, said pressure bed or plate being provided with arms extending upward in front of the roll to guide the sheet.

46. In combination with a key-lever D and type-bar C, push-bar E, connecting said parts and having its lower end shouldered and seated in an opening in the key-lever.

47. In combination with a clip or block, having laterally-projecting pivots, a bifurcated type-bar having sockets in its arms to receive said pivots.

48. In combination with a key-lever, a bifurcated type-bar and a block or support therefor, having lateral pivots, a link or push-rod connecting the type-bar and key-lever, and a pivot-pin passing through the arms of the type-bar and through the link or push-rod.

49. In a type-writing machine, a type-bar having its rear end bifurcated, and the two branches thus formed provided with sockets to receive pivots.

50. In a type-writing machine, the combination of a clip or block B, provided with laterally-projecting pivots, and a bifurcated type-bar, the branches of which are hung upon said pivots, substantially as described and shown.

51. In a type-writing machine, the combination of a bifurcated type-bar, which has a journal-bearing in the outer end of each fork, with a hanger, which has a journal or pivot-point on each side, and a lifting-rod pivoted between the two ends of the type-bar.

52. In a type-writing machine, the combination of a letter-space rack having the teeth on the upper edge thereof, attached to the main frame and adapted to vibrate transversely, and letter-space dogs attached to the carriage, with the letter-space vibratory frame.

53. In a type-writing machine, the combination of a carriage provided with spacing-dogs, a letter-space rack-bar having teeth on its upper edge, a vibratory frame provided with arms to bear against and vibrate said rack-bar, and a series of key-levers bearing upon and serving to rock the vibratory frame.

54. In combination with carriage J, having a rigid dog L and yielding dog $L^2$, rack-bar G, provided with arms $G^2$, levers $H^3$ provided with board $H^4$ and having their upright arms arranged to act upon the arms $G^2$, and a series of key-levers extending across board $H^4$, all substantially as set forth.

55. In combination with a traveling carriage, provided with a rigid and a yielding dog, a rack-bar pivotally supported in the main frame and adapted to move into line with the two dogs alternately.

56. In combination with a traveling carriage, a rigid dog and a yielding dog carried thereby, a rack-bar arranged to be oscillated across the paths of the two dogs, a lever for moving said rack-bar in one direction, and a spring for moving it in the opposite direction.

57. In combination with a traveling carriage, a lever pivoted thereto and provided with a rigid dog and a yielding dog, a rack-bar adapted to be moved from the path of one to the path of the other of said dogs, and means substantially such as described for moving the rack-bar.

58. In combination with a traveling carriage, a lever pivoted thereto and provided with a rigid and a yielding dog, a rack-bar movable from the path of one to the path of the other of said dogs, means substantially such as shown for moving said rack-bar, and a second lever connected with and serving to lift the lever carrying the dogs, whereby the dogs may be lifted out of engagement with the rack-bar.

59. In combination with carriage J, lever K, provided with dogs L, $L^2$, lever $K^2$, bar $K^3$, connecting the levers K, $K^2$, rack-bar G, and means substantially such as described for vibrating said rack-bar.

60. In combination with a traveling carriage, a rigid dog, and a dog having a spring-body, both attached to the carriage, and a rack-bar movable from the line of advance of one dog to that of the other.

61. In combination with carriage J, lever K, dogs L, $L^2$, carried by said lever, and vibratory rack-bar G.

62. In combination with carriage J, and vibratory rack-bar G, rigid dog L, and spring-dog $L^2$, carried by the carriage, and a stop in front of the spring-dog to limit its play.

63. In combination with carriage J, and vibratory rack-bar G, rigid dog L, spring-dog $L^2$, and an adjustable stop to limit and determine the play of the spring-dog.

64. In a type-writing machine, the combination with the main frame having a fixed top, of a supplemental top or frame hinged thereto, and a catch or fastening for locking the hinged top to the main frame.

65. In combination with the main frame of a type-writing machine, a supplemental top or frame hinged to the main frame and provided with guides or ways to support a platen-carriage.

66. In combination with the main frame of a type-writing machine having a fixed top, a supplemental top or frame hinged thereto and a movable platen carried by said supplemental top, the supplemental top being held against movement except about its hinges.

67. In combination with the main frame of a type-writing machine, a supplemental top or frame hinged to the main frame and provided with guides or ways, and a platen-carriage mounted and movable upon said guides or ways.

68. In combination with the main frame of a type-writing machine, a supplemental top or frame hinged to the main frame, guides or ways upon said hinged top, a traveling carriage mounted upon said guides or ways, and a platen mounted in said carriage.

69. In combination with the main frame of a type-writing machine having a fixed top, and with a supplemental top or frame hinged thereto, a stop to limit the movement of the supplemental top about its hinges.

70. The combination in a type-writer, of a main frame, a carriage arranged to move laterally on said frame, and a disengageable catch or fastening device constructed to prevent the carriage from swinging away from the frame when the machine is turned over, but which leaves the carriage free to travel laterally over the frame.

71. In combination with the primary or main top plate, carrying the type-levers, a secondary top plate bearing the paper or platen carriage, and adapted to be moved up and off from over the primary top plate and back to place.

72. In combination with the main frame of a type-writing machine, a supplemental top or frame hinged thereto, and provided with guides or ways, a traveling carriage mounted upon said guides or ways, a platen-roll mounted in said carriage, and an inking-ribbon also mounted in and movable bodily with said carriage.

73. In combination with the main frame of a type-writing machine, a supplemental top or frame hinged thereto, and provided with guides or ways, a traveling carriage mounted upon said ways, a platen mounted in said carriage, an inking-ribbon, spools mounted in said carriage and serving to carry the inking-ribbon, and means for rotating said spools and drawing the ribbon from one to the other.

74. In a type-writing machine, the combination with the main frame and traveling carriage, of an inking-ribbon; spools carrying said ribbon; bodily mounted in and movable with the carriage, and means for turning said spools.

75. In a type-writing machine, the combination of a main frame, a traveling carriage, spools mounted in said carriage, with their axes extending in the direction of its travel, an inking-ribbon carried by said spools, and means for rotating said spools.

76. In a type-writing machine, the combination of an inking-ribbon equal in width to the length of travel of the platen-carriage, two spools parallel with the front of said carriage, and a ribbon-moving apparatus, substantially as described.

77. In a type-writing machine, the combination of the carriage, an inking-ribbon traveling with the same, said inking-ribbon being parallel with the line to be printed and having a width not less than the longest line the machine can print, and mechanism whereby the inking-ribbon is moved transversely to the line of travel of said carriage.

78. In a type-writing machine, the combination of a main frame, a traveling carriage, spools mounted in said carriage and provided with ratchet-wheels, an inking-ribbon extending from one roll to the other, and a pivoted bar carrying dogs to engage with the ratchets one at a time, and to rotate the spools.

79. In combination with carriage J, spools S, S, provided respectively with ratchet-wheels U, U, a ribbon winding upon said spools, pivoted bar V, provided with dogs W, W, spring Z, and rock-shaft X, having arms $X^2 X^3$.

80. In combination with carriage J, spools S, S, provided respectively with ratchet-wheels U, U, ribbon T, pivoted bar V, provided with dogs W, W, spring Z, rock-shaft X, having arms $X^2 X^3$, and lever Y, arranged to bear upon arm $X^3$, all substantially as described.

81. In combination with the platen and its ratchet-wheel, an inking-ribbon, spools carrying said ribbon and provided with ratchet-wheels, a lever provided with dogs to engage the ratchet-wheels of the inking-ribbon spools, a rock-shaft having two arms, one arranged to bear upon the dog-lever, a dog-carrier provided with a dog to engage the ratchet-wheel of the platen and a hand-lever arranged to bear upon the platen dog-carrier and upon an arm of the rock-shaft, and thereby to turn the platen and the inking-ribbon spools.

82. In combination with a platen-roll and its ratchet mechanism, inking-ribbon spools and their ratchet mechanism, and spacing-dogs, a lever common to the two ratchet mechanisms and the spacing-dogs and adapted to operate all by a single movement.

83. In combination with a platen-roll and its ratchet, a dog-carrier and a dog for turning said roll, a lever provided with spacing-dogs, a rack-bar with which said dogs engage, and a hand-lever arranged to bear both upon the dog-carrier and the spacing-dog lever and to actuate both by a single movement.

84. In combination with inking-ribbon spools and an actuating-lever therefor, a lever provided with spacing-dogs, and a hand-lever arranged to bear upon both the aforesaid levers and adapted to turn the inking-ribbon spools and to lift the spacing-dogs at one operation.

85. In combination with a traveling carriage, a lever carried thereby and provided with spacing-dogs, a rack-bar movable across the paths of said dogs, inking-ribbon spools, a ribbon carried thereby, a rock-shaft for actuating said spools, and a hand-lever adapted to bear upon the spacing-dog lever and upon an arm of the rock-shaft and thereby to turn the inking-ribbon spools and lift the spacing-dogs at one operation.

86. In a type-writing machine, the combination with a platen-roll and its ratchet mechanism, of a hand-lever arranged to bear upon and actuate said mechanism and a guide-post for the end of said lever opposite that grasped by the operator.

87. In combination with the traveling carriage, spacing mechanism, type-bars, and key-levers of a type-writing machine, two spacing keys or plates located one at either side of the key-levers substantially as shown.

88. In combination with the spacing mechanism, key-levers D, and board H⁴, of a type-writing machine, levers I, one at either side of the series of key-levers, provided with finger-plates I², and arranged to bear upon the board H⁴.

89. In a type-writing machine, the combination of a platen, an inking-ribbon of a measurement in the direction of travel of the platen equal to the length of the line which the machine is adapted to print, and two spools parallel with the platen and serving to sustain the inking-ribbon.

90. In a type-writing machine, the combination of a traveling carriage, a platen mounted therein, ribbon-spools and an inking-ribbon carried by said spools, bodily movable with the carriage, and of a measurement in the direction of travel of the carriage equal to said travel.

91. In a type-writing machine, the combination of a traveling carriage, a platen, and an inking-ribbon as wide as or wider than the length of the printing-lines, distended between the platen and the types thereof, arranged and disposed to travel with the carriage thereof, and adapted to be shifted transversely to the line of travel of said carriage.

92. In a type-writing machine, the combination of a traveling carriage, ribbon-spools, supported in and bodily movable with the carriage, and an inking-ribbon carried by said spools.

93. In a type-writing machine, the combination of an inking-ribbon connected to the machine, and mechanism for automatically moving said ribbon in two directions, one at an angle to the other.

94. In a type-writing machine, the combination with a platen, of an inking-ribbon connected to two spools and automatically movable from one to the other, and also automatically movable in a direction at an angle to the first-mentioned movement.

95. In a type-writing machine, the combination of a platen; means for advancing the paper in one direction for line-spacing; an inking-ribbon; spools carrying said ribbon; means for automatically moving said spools endwise; and means for automatically rotating said spools in one or the other direction at will.

96. In a type-writing machine, the combination of a platen; means for advancing the paper in one direction for line-spacing; an inking-ribbon; spools for carrying said ribbon; means for automatically winding the ribbon from one spool to the other; and means for automatically moving said spools bodily for shifting the ribbon crosswise to its other movement.

97. In a type-writing machine, the combination of a platen; an inking-ribbon; and automatic mechanism separate from the platen, for imparting motion to the ribbon in two directions, one at an angle to the other.

98. In a type-writing machine, the combination of an inking-ribbon; spools for said ribbon; means for automatically moving said spools endwise; and mechanism for automatically turning the spools and winding the ribbon from one to the other, to give a movement to the ribbon in two directions.

99. In a type-writing machine, the combination of an inking-ribbon; means for supporting said ribbon independently of the platen; and mechanism for automatically moving the ribbon in two directions relatively to the printing-point, one at an angle to the other, whereby practically the whole surface of the ribbon is carried over the printing-point automatically.

100. In a type-writing machine, the combination of a suitable frame and printing devices; a carriage movable relatively to the frame; a paper roll or platen; an inking-ribbon; spools upon which said ribbon is wound, constructed to move in one direction during the travel of the carriage; and mechanism for automatically rotating said spools and thereby effecting a movement of the ribbon in a direction at an angle to the first-mentioned movement.

101. In a type-writing machine, the combination with a paper-carriage and printing devices, of an inking-ribbon; spools for said ribbon, constructed to move endwise automatically during the movement of the carriage; and automatic mechanism for rotating said spools about their axes; whereby practically the entire surface of the inking-ribbon is utilized.

102. In a type-writing machine, the combination of an inking-ribbon; spools therefor; automatic means for winding the ribbon from one spool to the other; and means for automatically moving the ribbon widthwise.

103. In a type-writing machine, the combination of a support for the paper, and a platen movable toward and from said support and adapted to yield automatically to accommodate different thicknesses or quantities of paper placed between the support and the platen.

104. In a type-writing machine, the combination of a series of printing-characters and means for actuating the same; a support adapted to sustain the paper to be printed upon, in the printing-plane; and a platen on the opposite side of the paper-support from the printing-characters, movable toward and from said support and thereby adapted to accommodate itself to the varying thickness of material between the paper-support and platen.

C. LATHAM SHOLES.

Witnesses:
HENRY R. KING,
LOUIS SHOLES.